United States Patent
Fujisaki et al.

(10) Patent No.: US 11,902,813 B2
(45) Date of Patent: Feb. 13, 2024

(54) MEASUREMENT RESULT RECEIVING APPARATUS, MEASURING APPARATUS, AND METHOD, PROGRAM, AND RECORDING MEDIUM FOR THE SAME

(71) Applicant: ADVANTEST Corporation, Tokyo (JP)

(72) Inventors: Takashi Fujisaki, Gunma (JP); Kazuhiro Shibano, Gunma (JP); Kenji Nishikawa, Saitama (JP)

(73) Assignee: ADVANTEST CORPORATION, Tokyo (JP)

( * ) Notice: Subject to any disclaimer, the term of this patent is extended or adjusted under 35 U.S.C. 154(b) by 420 days.

(21) Appl. No.: 17/278,501

(22) PCT Filed: Aug. 7, 2019

(86) PCT No.: PCT/JP2019/031223
§ 371 (c)(1),
(2) Date: Mar. 22, 2021

(87) PCT Pub. No.: WO2020/105232
PCT Pub. Date: May 28, 2020

(65) Prior Publication Data
US 2022/0038930 A1    Feb. 3, 2022

(30) Foreign Application Priority Data
Nov. 21, 2018  (JP) .................. 2018-218001

(51) Int. Cl.
H04W 24/10  (2009.01)
G08C 17/02  (2006.01)

(52) U.S. Cl.
CPC ............ *H04W 24/10* (2013.01); *G08C 17/02* (2013.01)

(58) Field of Classification Search
None
See application file for complete search history.

(56) References Cited

U.S. PATENT DOCUMENTS 7,941,232 B2 * 5/2011 Ishii .................... G03F 7/70641
430/30
10,534,065 B2 * 1/2020 Syrjärinne .......... G01S 5/02521
(Continued)

FOREIGN PATENT DOCUMENTS

JP    2003-242583    8/2003
JP    2005-202517    7/2005
(Continued)

OTHER PUBLICATIONS

International Search Report (ISR) from International Searching Authority (Japan Patent Office) in International Pat. Appl. No. PCT/JP2019/031223, dated Nov. 5, 2019, along with an English language translation thereof.

(Continued)

*Primary Examiner* — Anh Vu H Ly
(74) *Attorney, Agent, or Firm* — Greenblum & Bernstein, P.L.C.

(57) ABSTRACT

A measurement result receiving apparatus receives measurement results transmitted from a plurality of measuring devices, the measurement results obtained by conducting a measurement at a predetermined sampling interval according to a reference clock of each measuring device. The measurement result receiving apparatus includes a receiving section that receives the measurement results from the plurality of measuring devices; and a sampling interval converting section that converts the measurement results into measurement values associated with a common sampling interval.

3 Claims, 6 Drawing Sheets

(56) References Cited

U.S. PATENT DOCUMENTS

| | | | |
|---|---|---|---|
| 2003/0158682 A1 | 8/2003 | Tanizume | |
| 2014/0056318 A1* | 2/2014 | Hansson | H04L 43/0858 |
| | | | 370/503 |
| 2018/0198545 A1 | 7/2018 | Aichriedler et al. | |
| 2019/0142525 A1* | 5/2019 | Malackowski | G01S 17/86 |
| | | | 398/115 |
| 2019/0223125 A1* | 7/2019 | Simon | H04W 56/0015 |
| 2021/0383462 A1* | 12/2021 | Nagasawa | G06Q 50/06 |

FOREIGN PATENT DOCUMENTS

| | | |
|---|---|---|
| JP | 2007-048024 | 2/2007 |
| JP | 2007-188299 | 7/2007 |
| JP | 2007-206848 | 8/2007 |
| JP | 2012-047585 | 3/2012 |

OTHER PUBLICATIONS

Written Opinion (WO) from International Searching Authority (Japan Patent Office) in International Pat. Appl. No. PCT/JP2019/031223, dated Nov. 5, 2019, along with an English language translation thereof.

* cited by examiner

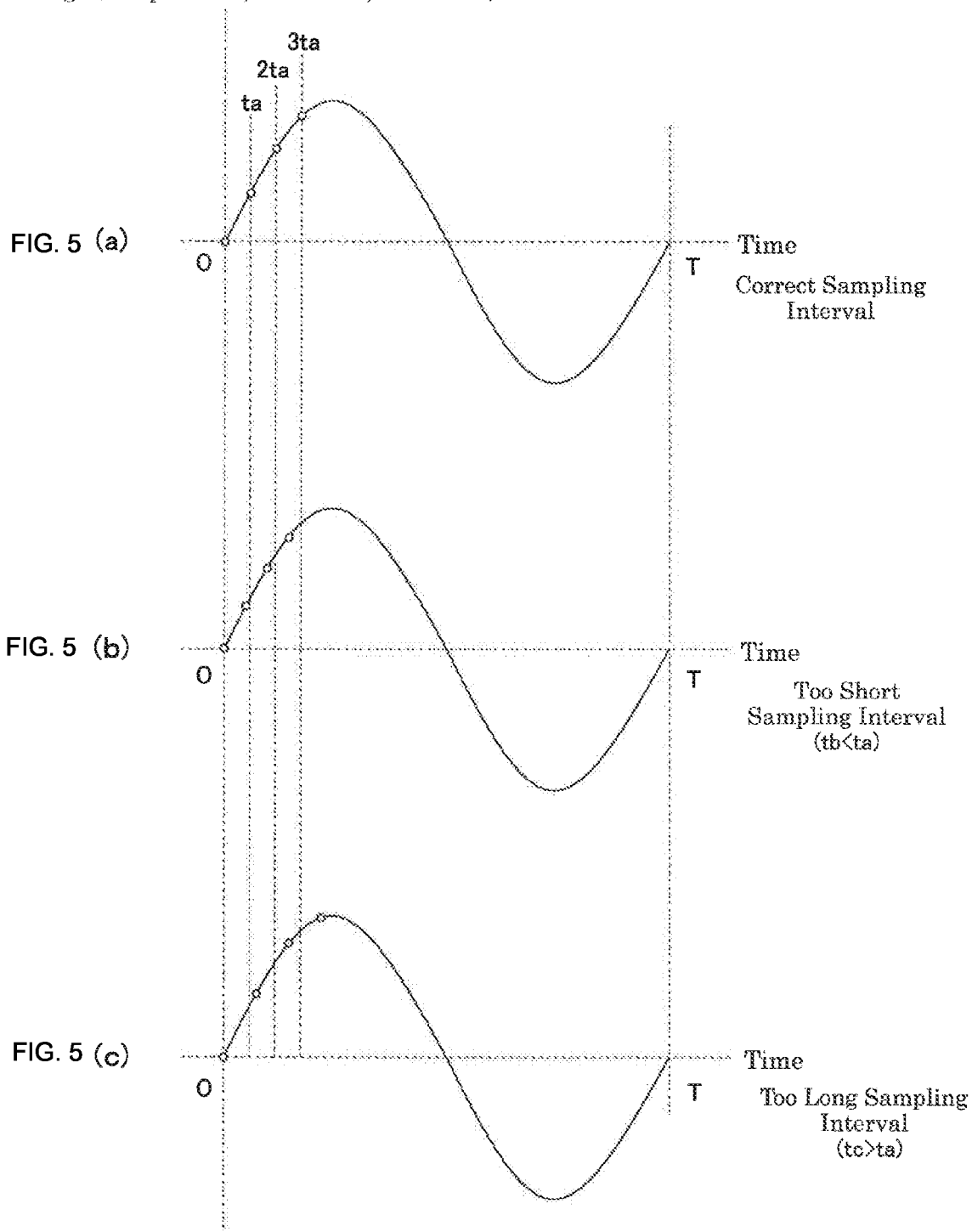

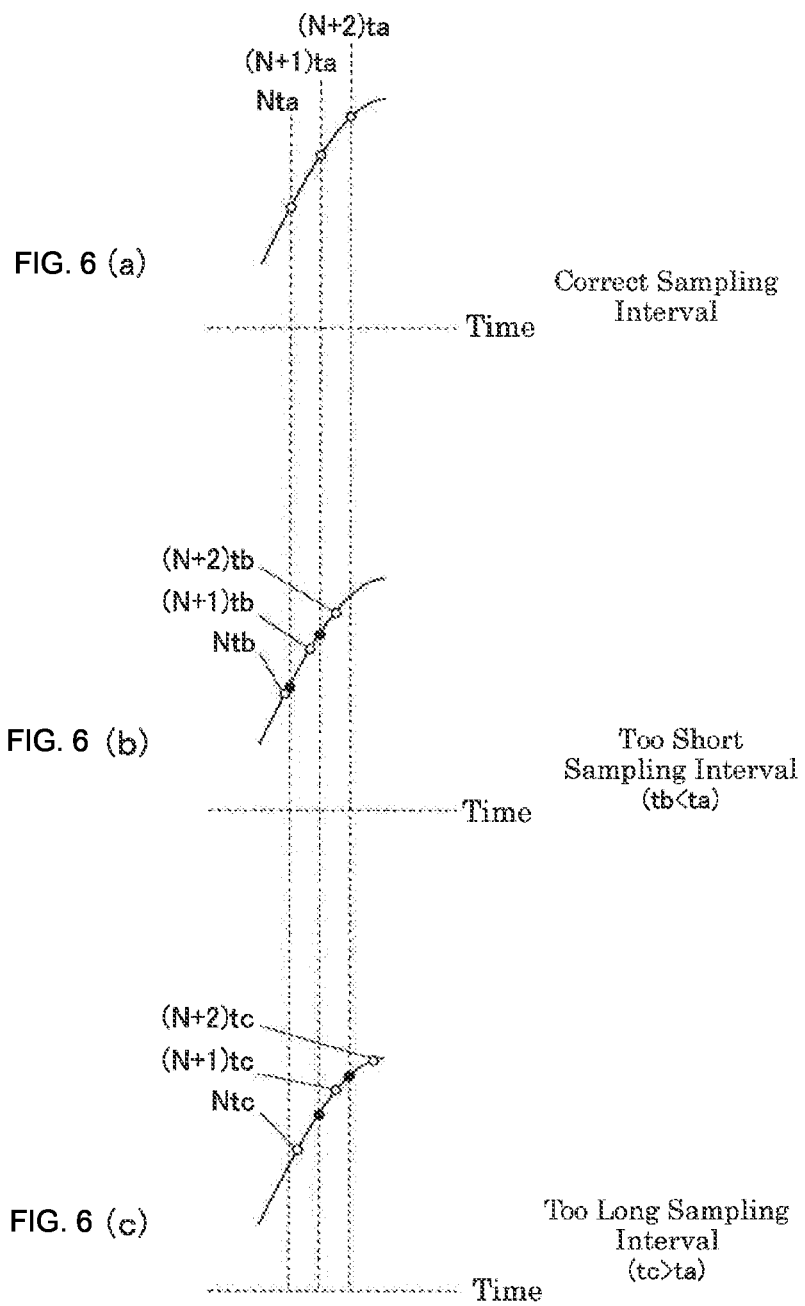

MEASUREMENT RESULT RECEIVING APPARATUS, MEASURING APPARATUS, AND METHOD, PROGRAM, AND RECORDING MEDIUM FOR THE SAME

TECHNICAL FIELD

The present invention relates to processing of measurement results received from multiple measuring devices.

BACKGROUND ART

There has conventionally been known wirelessly receiving and processing measurement results from multiple measuring devices (see Abstract of Patent Literature 1, for example). The multiple measuring devices each conduct a measurement at a predetermined sampling interval according to a reference clock thereof.

CITATION LIST

Patent Literature

Patent Literature 1: Japanese Patent Application Publication No. 2007-48024

SUMMARY OF THE INVENTION

Problem to be Solved by the Invention

In such a related art as described above, however, in case of an error in the frequency of the reference clock of each measuring device, measurement results from the measuring devices cannot be synchronized.

It is hence an object of the present invention to synchronize measurement results from measuring devices even in case of an error in the frequency of the reference clock of each measuring device.

Means for Solving the Problem

According to the present invention, a measurement result receiving apparatus for receiving measurement results transmitted from a plurality of measuring devices, the measurement results obtained by conducting a measurement at a predetermined sampling interval according to a reference clock of each measuring device, includes: a receiving section that receives the measurement results from the plurality of measuring devices; and a sampling interval converting section that converts the measurement results into measurement values associated with a common sampling interval.

The thus constructed measurement result receiving apparatus receives measurement results transmitted from a plurality of measuring devices, the measurement results obtained by conducting a measurement at a predetermined sampling interval according to a reference clock of each measuring device. A receiving section receives the measurement results from the plurality of measuring devices. A sampling interval converting section converts the measurement results into measurement values associated with a common sampling interval.

According to the present invention, the measurement result receiving apparatus may further include: a transmitting section that transmits, to the plurality of measuring devices, a measurement initiation signal indicating measurement initiation and a predetermined time lapse signal indicating lapse of a predetermined time from the measurement initiation.

According to the measurement result receiving apparatus of the present invention, the communication of the receiving section may be faster than the communication of the transmitting section.

According to the measurement result receiving apparatus of the present invention, the sampling interval converting section may have: a sampling interval deriving section that derives a sampling interval for each of the plurality of measuring devices based on the predetermined time and the number of the measurement results received from the plurality of measuring devices; and a measurement value deriving section that derives the measurement values based on the measurement results and the derived sampling intervals.

According to the measurement result receiving apparatus of the present invention, the measurement value deriving section may be arranged to derive the measurement values by interpolating the measurement results.

According to the measurement result receiving apparatus of the present invention, the measurement results may include any two or more of temperature, humidity, voltage, current, resistance, distortion, velocity, acceleration, rotation, magnetic field, position, altitude, pressure, and illuminance.

A wireless data logger may include the measurement result receiving apparatus according to the present invention, According to the present invention, a measuring apparatus includes: a reference clock; a measuring section that conducts a measurement at a predetermined sampling interval according to the reference clock; a measurement result transmitting section that transmits measurement results measured by the measuring section; and a control signal receiving section that receives a measurement initiation signal indicating measurement initiation and a predetermined time lapse signal indicating lapse of a predetermined time from the measurement initiation, wherein the communication of the measurement result transmitting section is faster than the communication of the control signal receiving section.

The thus constructed measuring apparatus include a reference clock. A measuring section conducts a measurement at a predetermined sampling interval according to the reference clock. A measurement result transmitting section transmits measurement results measured by the measuring section. A control signal receiving section receives a measurement initiation signal indicating measurement initiation and a predetermined time lapse signal indicating lapse of a predetermined time from the measurement initiation. The communication of the measurement result transmitting section is faster than the communication of the control signal receiving section.

According to the measuring apparatus of the present invention, the measurement results may include any two or more of temperature, humidity, voltage, current, resistance, distortion, velocity, acceleration, rotation, magnetic field, position, altitude, pressure, and illuminance.

A wireless data logger may include the measuring apparatus according to the present invention, According to the present invention, a measurement result receiving method of receiving measurement results transmitted from a plurality of measuring devices, the measurement results obtained by conducting a measurement at a predetermined sampling interval according to a reference clock of each measuring device, includes: receiving the measurement results from the plurality of measuring devices; and converting the measurement results into measurement values associated with a common sampling interval.

The present invention is a program of instructions for execution by a computer to perform a measurement result receiving process of receiving measurement results transmitted from a plurality of measuring devices, the measurement results obtained by conducting a measurement at a predetermined sampling interval according to a reference clock of each measuring device, the process including: receiving the measurement results from the plurality of measuring devices; and converting the measurement results into measurement values associated with a common sampling interval.

The present invention is a non-transitory computer-readable medium having a program of instructions for execution by a computer to perform a measurement result receiving process of receiving measurement results transmitted from a plurality of measuring devices, the measurement results obtained by conducting a measurement at a predetermined sampling interval according to a reference clock of each measuring device, the process including: receiving the measurement results from the plurality of measuring devices; and converting the measurement results into measurement values associated with a common sampling interval.

According to the present invention, a measuring method includes: generating a reference clock; conducting a measurement at a predetermined sampling interval according to the reference clock; transmitting measurement results measured by the conducting the measurement; and receiving a measurement initiation signal indicating measurement initiation and a predetermined time lapse signal indicating lapse of a predetermined time from the measurement initiation, wherein the communication of the transmitting is faster than the communication of the receiving.

The present invention is a program of instructions for execution by a computer to perform a measuring process, the process including: generating a reference clock; conducting a measurement at a predetermined sampling interval according to the reference clock; transmitting measurement results measured by the conducting the measurement; and receiving a measurement initiation signal indicating measurement initiation and a predetermined time lapse signal indicating lapse of a predetermined time from the measurement initiation, wherein the communication of the transmitting is faster than the communication of the receiving.

The present invention is a non-transitory computer-readable medium having a program of instructions for execution by a computer to perform a measuring process, the process including: generating a reference clock; conducting a measurement at a predetermined sampling interval according to the reference clock; transmitting measurement results measured by the conducting the measurement; and receiving a measurement initiation signal indicating measurement initiation and a predetermined time lapse signal indicating lapse of a predetermined time from the measurement initiation, wherein the communication of the transmitting is faster than the communication of the receiving.

BRIEF DESCRIPTION OF DRAWINGS

FIGS. 5(a)-5(c) are graphs showing measurement results when a measurement is conducted at a predetermined sampling interval according to the reference clock 2d in each of the measuring devices 2 from the measurement initiation to the predetermined time T, respectively, in the case of a correct sampling interval (FIG. 5 (a)), a too short sampling interval (FIG. 5 (b)), and a too long sampling interval (FIG. 5 (c)); and FIGS. 6(a)-6(c) are graphs for illustrating conversion of measurement results into measurement values associated with a common sampling interval, respectively, in the case of a correct sampling interval (FIG. 6 (a)), a too short sampling interval (FIG. 6 (b)), and a too long sampling interval (FIG. 6 (c)).

MODES FOR CARRYING OUT THE INVENTION

A description will now be given of an embodiment of the present invention referring to drawings.

Figure 1:
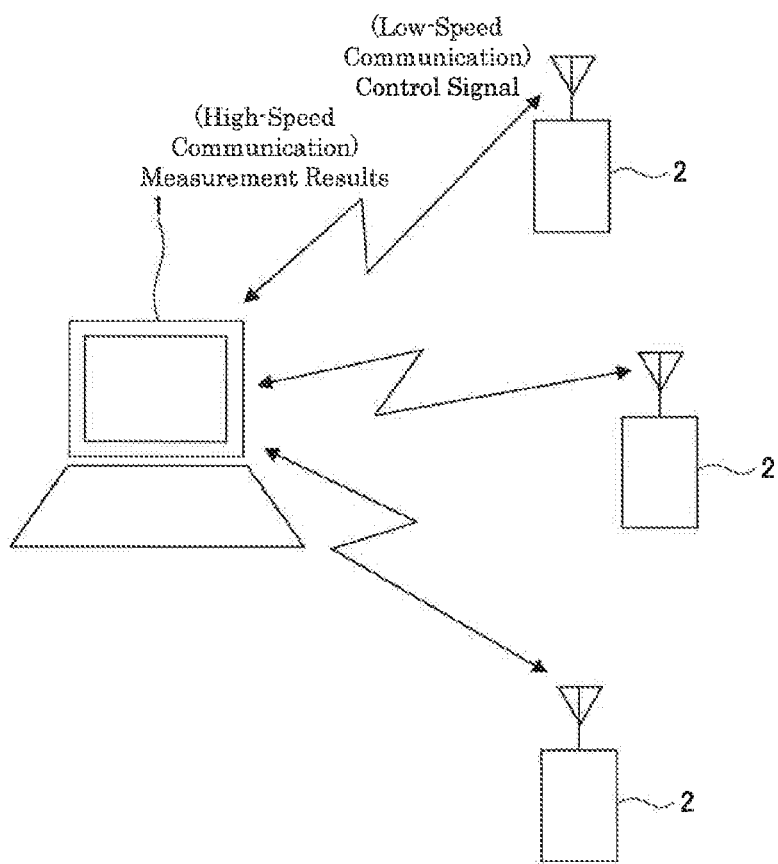
FIG. 1 shows the configuration of a wireless communication system according to an embodiment of the present invention.

FIG. 1 shows the configuration of a wireless communication system according to an embodiment of the present invention. The wireless communication system according to the embodiment of the present invention includes a measurement result receiving apparatus 1 and multiple measuring devices 2.

The measuring devices 2 are each arranged to measure the voltage, temperature, or distortion (or otherwise may be humidity, current, resistance, velocity, acceleration, rotation, magnetic field, position, altitude, pressure, illuminance) of a to-be-measured object (e.g. an automobile or a semiconductor without limitation), and wirelessly transmit the measurement result to the measurement result receiving apparatus 1. It is noted that the measurement result may be any two or more of voltage, temperature, distortion, humidity, current, resistance, velocity, acceleration, rotation, magnetic field, position, altitude, pressure, and illuminance. The multiple measuring devices 2 are each arranged to conduct a measurement at a predetermined sampling interval (e.g. 1 ms) according to a reference clock (e.g. 1 kHz).

The measurement result receiving apparatus 1 is arranged to wirelessly receive measurement results transmitted from the measuring devices 2. The measurement result receiving apparatus 1 is also arranged to wirelessly transmit a control signal for controlling a measurement to each measuring device 2. The control signal includes, for example, a measurement initiation signal indicating measurement initiation, a predetermined time lapse signal indicating lapse of a predetermined time T (e.g. 2 seconds) from the measurement initiation, and a transmission request signal for requesting each measuring device 2 to transmit a measurement result.

It is noted that the measurement result receiving apparatus 1 includes, for example, a common personal computer with a wireless communication router (for high-speed communication) wire-connected thereto and further with a wireless LAN unit (for low-speed communication) connected to a USB port thereof.

It is noted that the transmission and reception of measurement results is faster than the transmission and reception of control signals. Measurement results are transmitted and received on a Wi-Fi, for example.

Figure 2:
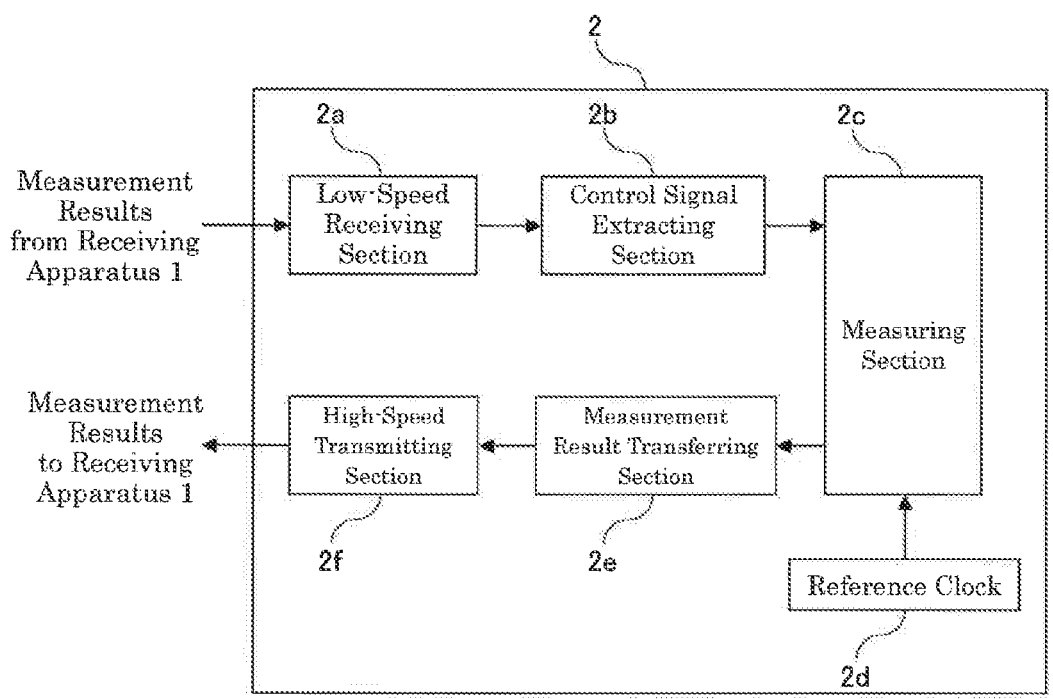
FIG. 2 is a functional block diagram showing the configuration of each of the measuring devices 2 according to the embodiment of the present invention.

FIG. 2 is a functional block diagram showing the configuration of each of the measuring devices 2 according to the embodiment of the present invention. The measuring device 2 according to the embodiment of the present invention includes a low-speed receiving section (control signal receiving section) 2a, a control signal extracting section 2b, a measuring section 2c, a reference clock 2d, a measurement result transferring section 2e, and a high-speed transmitting section (measurement result transmitting section) 2f.

The low-speed receiving section (control signal receiving section) 2a is arranged to receive a control signal (e.g. a measurement initiation signal, a predetermined time lapse signal, and a transmission request signal as described above).

The control signal extracting section 2b is arranged to extract the control signal from the low-speed receiving section 2a and transfer it to the measuring section 2c.

The measuring section 2c is arranged to conduct a measurement according to the control signal. For example, the measuring section 2c is arranged to initiate a measurement upon reception of a measurement initiation signal. The measuring section 2c is arranged to, upon reception of a predetermined time lapse signal, integrate measurement results from the measurement initiation to the reception of the predetermined time lapse signal into a transmittable piece. The measuring section 2c is arranged to, upon reception of a transmission request signal, provide measurement results from the measurement initiation to the reception of the predetermined time lapse signal to the measurement result transferring section 2e.

The reference clock 2d is arranged to provide a reference clock signal to the measuring section 2c. According to the reference clock signal, the measuring section 2c is arranged to conduct a measurement at a predetermined sampling interval. It is noted that the frequency of the reference clock signal should intrinsically be identical in every measuring device 2 (e.g. 1 kHz), but practically has a subtle error.

The measurement result transferring section 2e is arranged to provide measurement results received from the measuring section 2c to the high-speed transmitting section 2f.

The high-speed transmitting section (measurement result transmitting section) 2f is arranged to transmit measurement results from the measuring section 2c to the measurement result receiving apparatus 1. The communication of the high-speed transmitting section 2f is faster than the communication of the low-speed receiving section 2a. Transmission from the high-speed transmitting section 2f is performed on a Wi-Fi, for example.

It is noted that the high-speed transmitting section 2f may receive information on measurement results from the measurement result receiving apparatus 1. It is also noted that the low-speed receiving section 2a may transmit information on control signals to the measurement result receiving apparatus 1.

Figure 3:
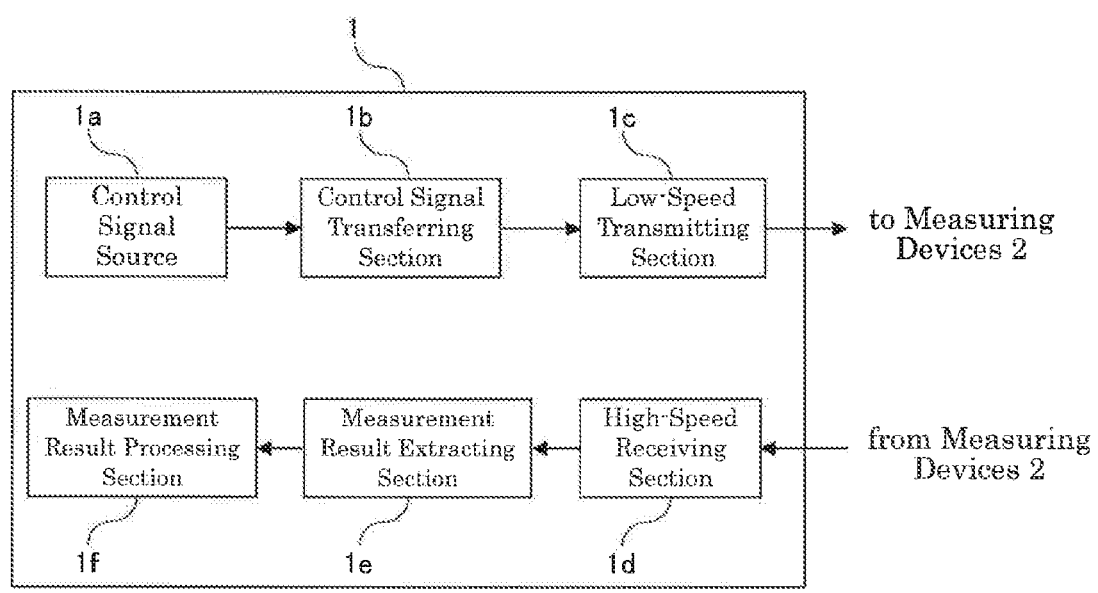
FIG. 3 is a functional block diagram showing the configuration of the measurement result receiving apparatus 1 according to the embodiment of the present invention.

FIG. 3 is a functional block diagram showing the configuration of the measurement result receiving apparatus 1 according to the embodiment of the present invention.

The measurement result receiving apparatus 1 according to the embodiment of the present invention includes a control signal source 1a, a control signal transferring section 1b, a low-speed transmitting section 1c, a high-speed receiving section 1d, a measurement result extracting section 1e, and a measurement result processing section 1f.

The control signal source 1a is arranged to output a control signal (e.g. a measurement initiation signal, a predetermined time lapse signal, and a transmission request signal as described above).

The control signal transferring section 1b is arranged to receive a control signal from the control signal source 1a and transfer it to the low-speed transmitting section 1c.

The low-speed transmitting section 1c is arranged to transmit the control signal to the multiple measuring devices 2.

The high-speed receiving section 1d is arranged to receive measurement results from the multiple measuring devices 2. It is noted that the communication of the high-speed receiving section 1d is faster than the communication of the low-speed transmitting section 1c. Reception at the high-speed receiving section 1d is performed on a Wi-Fi, for example.

The measurement result extracting section 1e is arranged to extract the measurement results from the reception at the high-speed receiving section 1d.

The measurement result processing section 1f is arranged to receive and process the measurement results from the measurement result extracting section 1e.

It is noted that the high-speed receiving section 1d may transmit information on measurement results to the measuring devices 2. It is also noted that the low-speed transmitting section 1c may receive information on control signals from the measuring devices 2.

Figure 4:
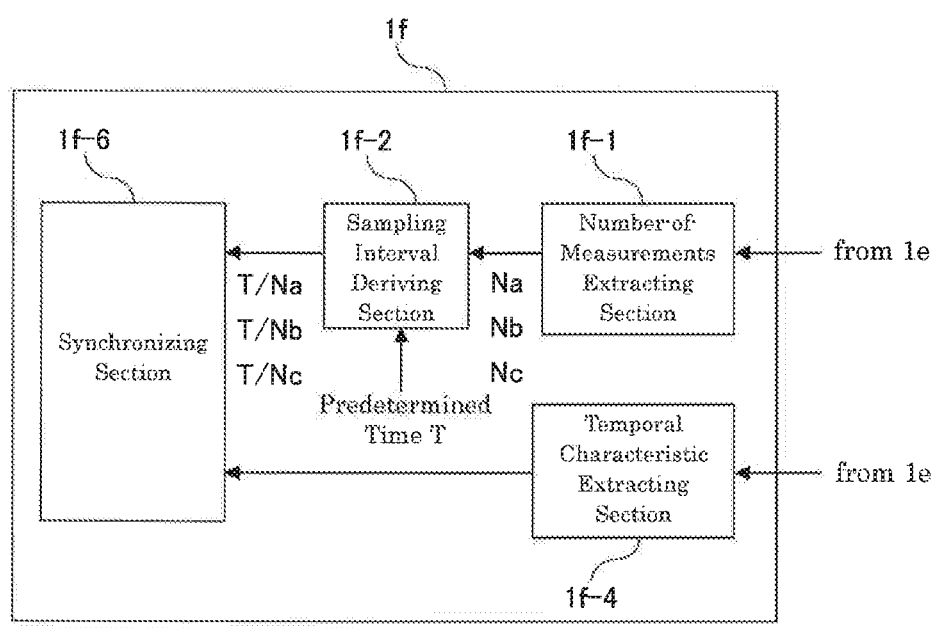
FIG. 4 is a functional block diagram showing the configuration of the measurement result processing section 1f according to the embodiment of the present invention.

FIG. 4 is a functional block diagram showing the configuration of the measurement result processing section 1f according to the embodiment of the present invention. The measurement result processing section 1f according to the embodiment of the present invention includes a number-of-measurements extracting section 1f-1, a sampling interval deriving section 1f-2, a temporal characteristic extracting section 1f-4, and a synchronizing section (measurement value deriving section) 1f-6. It is noted that the sampling interval deriving section 1f-2 and the synchronizing section (measurement value deriving section) 1f-6 correspond to a sampling interval converting section.

The temporal characteristic extracting section 1f-4 is arranged to extract the characteristic of measurement result to time (i.e. temporal characteristic) from a measurement result and provide it to the synchronizing section 1f-6.

The number-of-measurements extracting section 1f-1 is arranged to extract, from a measurement result, the number of measurements in the measurement result from the measurement initiation to the reception of the predetermined time lapse signal and provide it to the sampling interval deriving section 1f-2. For example, 1f the predetermined time T is 2 seconds and the intrinsic value of the frequency of the reference clock is 1 kHz and when measurement results are received from a measuring device 2 having a correct sampling interval (the number of measurements Na=2000) (sampling interval=1 ms), a measuring device 2 having a too short sampling interval (the number of measurements Nb>Na (e.g. Nb=2010)), and a measuring device 2 having a too long sampling interval (the number of measurements Nc<Na (e.g. Nc=1995)), Na, Nb, and Nc are extracted from the respective measurement results and provided to the sampling interval deriving section 1f-2.

The sampling interval deriving section 1f-2 and the synchronizing section 1f-6 are arranged to convert the measurement result into a measurement value associated with a common sampling interval.

The sampling interval deriving section 1f-2 is arranged to derive sampling intervals for the respective multiple measuring devices 2 based on the predetermined time T and the number of measurement results Na, Nb, Nc received from the respective multiple measuring devices 2 (received from the number-of-measurements extracting section 1*f*-1).

For example, the sampling interval deriving section 1*f*-2 is arranged to derive sampling intervals: T/Na (=ta=1 ms) for the measuring device 2 having a correct sampling interval (the number of measurements Na), T/Nb (=tb) for the measuring device 2 having a too short sampling interval (the number of measurements Nb), and T/Nc (=tc) for the measuring device 2 having a too long sampling interval (the number of measurements Nc).

The synchronizing section (measurement value deriving section) 1*f*-6 is arranged to derive measurement values associated with a common sampling interval based on the measurement results (the temporal characteristics extracted therefrom) and the sampling intervals T/Na (=ta=1 ms), T/Nb (=tb), T/Nc (=tc) derived by the sampling interval deriving section 1*f*-2. It is noted that the measurement values can be derived by interpolating the measurement results.

A method for deriving a measurement value through interpolation of a measurement result will hereinafter be described.

FIG. 5 is a graph showing measurement results when a measurement is conducted at a predetermined sampling interval according to the reference clock 2*d* in each of the measuring devices 2 from the measurement initiation to the predetermined time T, respectively, in the case of a correct sampling interval (FIG. 5 (*a*)), a too short sampling interval (FIG. 5 (*b*)), and a too long sampling interval (FIG. 5 (*c*)). It is noted that FIG. 5 is under the assumption that the measuring devices 2 measure a common to-be-measured object.

First, referring to FIG. 5 (*a*), in the case of a correct sampling interval, the sampling interval is defined as ta (=1 ms). Measurement results are then obtained at the time ta, 2*ta*, 3*ta*, . . . (i.e. 1, 2, 3, . . . ms).

Next, referring to FIG. 5 (*b*), in the case of a too short sampling interval, the sampling interval is defined as tb. Measurement results are then obtained at the time tb, 2*tb*, 3*tb*, . . . , which are earlier than in the case of a correct sampling interval. In this case, the measurement results, 1*f* considered to be obtained at the time 1, 2, 3, . . . ms, are incorrect ones. It is hence necessary to tailor the measurement results obtained at the time tb, 2*tb*, 3*tb*, . . . to the measurement results obtained at the time ta, 2*ta*, 3*ta*, . . . (i.e. 1, 2, 3, . . . ms).

Next, referring to FIG. 5 (*c*), in the case of a too long sampling interval, the sampling interval is defined as tc. Measurement results are then obtained at the time tc, 2*tc*, 3*tc*, . . . , which are later than in the case of a correct sampling interval. In this case, the measurement results, if considered to be obtained at the time 1, 2, 3, . . . ms, are incorrect ones. It is hence necessary to tailor the measurement results obtained at the time tc, 2*tc*, 3*tc*, . . . to the measurement results obtained at the time ta, 2*ta*, 3*ta*, . . . (i.e. 1, 2, 3, . . . ms).

FIG. 6 is a graph for illustrating conversion of measurement results into measurement values associated with a common sampling interval, respectively, in the case of a correct sampling interval (FIG. 6 (*a*)), a too short sampling interval (FIG. 6 (*b*)), and a too long sampling interval (FIG. 6 (*c*)). Note that N in FIG. 6 represents an integer equal to or greater than 1 but equal to or less than T/ta (=2000).

The common sampling interval employs a correct sampling interval (1 ms).

First, in the case of a correct sampling interval (see FIG. 6 (*a*)), the measurement results are used directly as measurement values.

Next, in the case of a too short sampling interval (see FIG. 6 (*b*)), the time Nta exists between the time Ntb and the time (N+1)tb. Accordingly, the measurement value at the time Nta (indicated by a black circle) can be obtained through linear interpolation between the measurement result at the time Ntb and the measurement result at the time (N+1)tb. It is noted that tb can be obtained as T/Nb by the sampling interval deriving section 1*f*-2. Similarly, the measurement value at the time (N+1)ta (indicated by a black circle) can be obtained through linear interpolation between the measurement result at the time (N+1)tb and the measurement result at the time (N+2)tb.

Next, in the case of a too long sampling interval (see FIG. 6 (*c*)), the time (N+1)ta exists between the time Ntc and the time (N+1)tc. Accordingly, the measurement value at the time (N+1)ta (indicated by a black circle) can be obtained through linear interpolation between the measurement result at the time Ntc and the measurement result at the time (N+1)tc. It is noted that tc can be obtained as T/Nc by the sampling interval deriving section 1*f*-2. Similarly, the measurement value at the time (N+2)ta (indicated by a black circle) can be obtained through linear interpolation between the measurement result at the time (N+1)tc and the measurement result at the time (N+2)tc.

Note that without being limited to linear interpolation, another type of interpolation (e.g. least-square method) may be used.

Next will be described an operation according to the embodiment of the present invention.

First, the control signal source 1*a* of the measurement result receiving apparatus 1 outputs a measurement initiation signal. The measurement initiation signal is transmitted from the low-speed transmitting section 1*c* to the multiple measuring devices 2. Each of the measuring devices 2 receives the measurement initiation signal at the low-speed receiving section 2*a*. The measuring section 2*c* then initiates a measurement. The measurement is conducted at a predetermined sampling interval according to a reference clock signal output from the reference clock 2*d*. Note, however, that there occurs a subtle error between the reference clocks 2*d*, that is, some of them may have a too short sampling interval (see FIG. 5 (*b*)), while some other of them may have a too long sampling interval (see FIG. 5 (*c*)).

Next, the control signal source 1*a* of the measurement result receiving apparatus 1 outputs a predetermined time lapse signal. The predetermined time lapse signal is transmitted from the low-speed transmitting section 1*c* to the multiple measuring devices 2. Upon reception of the predetermined time lapse signal, the measuring section 2*c* of the measuring device 2 integrates measurement results from the measurement initiation to the reception of the predetermined time lapse signal (measurement results at time 0 to T; see FIG. 5) into a transmittable piece.

The control signal source 1*a* of the measurement result receiving apparatus 1 further outputs a transmission request signal. The transmission request signal is transmitted from the low-speed transmitting section 1*c* to the multiple measuring devices 2. Upon reception of the transmission request signal, the measuring section 2*c* of the measuring device 2 provides the measurement results from the measurement initiation to the reception of the predetermined time lapse signal (measurement results at time 0 to T; see FIG. 5) to the measurement result transferring section 2*e*. The measurement results are transmitted from the high-speed transmitting section 2*f* to the measurement result receiving apparatus 1.

The measurement results from the measuring devices 2 are received at the high-speed receiving section 1*d* and processed through the measurement result processing section 1*f*.

First, the number-of-measurements extracting section 1*f*-1 extracts, from the measurement results, the number of measurements (Na, Nb, Nc) in the measurement results (measurement results at time 0 to T). The sampling interval deriving section 1*f*-2 derives sampling intervals T/Na (=ta=1 ms), T/Nb (=tb), T/Nc (=tc) for the respective measuring devices 2 based on the number of measurements (Na, Nb, Nc) and the predetermined time T. The synchronizing section 1*f*-6 receives the sampling intervals ta, tb, tc from the sampling interval deriving section 1*f*-2 and temporal characteristics from the temporal characteristic extracting section 1*f*-4 to derive measurement values associated with the common sampling interval ta (see FIG. 6).

For example, referring to FIG. 6 (*b*), the measurement value at the time Nta (indicated by a black circle) is derived through linear interpolation between the measurement result at the time Ntb and the measurement result at the time (N+1)tb.

For example, referring to FIG. 6 (*c*), the measurement value at the time (N+1)ta (indicated by a black circle) is derived through linear interpolation between the measurement result at the time Ntc and the measurement result at the time (N+1)tc.

In accordance with the embodiment of the present invention, even in case of an error in the frequency of the reference clock 2*d* of each measuring device 2, the measurement results from each measuring device 2 can be aligned with the measurement values at the sampling interval ta and thereby synchronized.

Further, in accordance with the embodiment of the present invention, the transmission and reception of measurement results is faster than the transmission and reception of control signals. Accordingly, even a large volume of measurement results can be received and processed by the measurement result receiving apparatus 1.

It is noted that the measurement result receiving apparatus 1 and the measuring devices 2 constitute a wireless data logger.

The above-described embodiment may also be implemented as follows. A computer including a CPU, a hard disk, and a medium (USB memory, CD-ROM, or the like) reading device is caused to read a medium with a program recorded thereon that achieves the above-described components (e.g. the components of the measurement result receiving apparatus 1 and the components of each measuring device 2) and install the program in the hard disk. The above-described features can also be achieved in this manner.

DESCRIPTION OF REFERENCE NUMERAL

1 Measurement Result Receiving Apparatus
1*a* Control Signal Source
1*b* Control Signal Transferring Section
1*c* Low-Speed Transmitting Section
1*d* High-Speed Receiving Section
1*e* Measurement Result Extracting Section
1*f* Measurement Result Processing Section
1*f*-1 Number-of-Measurements Extracting Section
1*f*-2 Sampling Interval Deriving Section
1*f*-4 Temporal Characteristic Extracting Section
1*f*-6 Synchronizing Section (Measurement Value Deriving Section)
2 Measuring Device
2*a* Low-Speed Receiving Section (Control Signal Receiving Section)
2*b* Control Signal Extracting Section
2*c* Measuring Section
2*d* Reference Clock
2*e* Measurement Result Transferring Section
2*f* High-Speed Transmitting Section (Measurement Result Transmitting Section)
Na, Nb, Nc Number of Measurements
ta, tb, tc Sampling Interval
T Predetermined Time

The invention claimed is:

1. A measurement result receiving method of receiving measurement results transmitted from a plurality of measuring devices, the measurement results obtained by conducting a measurement at a predetermined sampling interval according to a reference clock of each measuring device, the measurement result receiving method comprising:
   transmitting, to the plurality of measuring devices, a measurement initiation signal indicating measurement initiation and a predetermined time lapse signal indicating lapse of a predetermined time from the measurement initiation;
   receiving the measurement results from the plurality of measuring devices;
   deriving a sampling interval for each of the plurality of measuring devices based on the predetermined time and a number of the measurement results received from the plurality of measuring devices; and
   deriving measurement values based on the measurement results and the derived sampling intervals.

2. A non-transitory computer-readable medium including a program of instructions for execution by a computer to perform a measurement result receiving process of receiving measurement results transmitted from a plurality of measuring devices, the measurement results obtained by conducting a measurement at a predetermined sampling interval according to a reference clock of each measuring device, the measurement result receiving process comprising:
   transmitting, to the plurality of measuring devices, a measurement initiation signal indicating measurement initiation and a predetermined time lapse signal indicating lapse of a predetermined time from the measurement initiation;
   receiving the measurement results from the plurality of measuring devices;
   deriving a sampling interval for each of the plurality of measuring devices based on the predetermined time and a number of the measurement results received from the plurality of measuring devices; and
   deriving measurement values based on the measurement results and the derived sampling intervals.

3. The measurement result receiving method according to claim 1, wherein
   the measurement values are derived by interpolating the measurement results.

* * * * *